United States Patent [19]

Piepho et al.

[11] Patent Number: 4,933,428

[45] Date of Patent: Jun. 12, 1990

[54] POLYMERIZABLE WATER SOLUBLE BINDERS

[75] Inventors: Michael Piepho, Fallingbostel; Erhard Lühmann, Bomlitz; Lutz Hoppe; Klaus Szablikowski, both of Walsrode, all of Fed. Rep. of Germany

[73] Assignee: Wolff Walsrode AG, Walsrode, Fed. Rep. of Germany

[21] Appl. No.: 283,346

[22] Filed: Dec. 12, 1988

[30] Foreign Application Priority Data

Dec. 15, 1987 [DE] Fed. Rep. of Germany ....... 3742446

[51] Int. Cl.$^5$ .............................................. C08C 63/02
[52] U.S. Cl. .................... 528/272; 528/296; 528/297; 528/300; 528/306; 528/308; 528/499; 525/42; 525/43; 525/44; 525/451; 525/921
[58] Field of Search ............... 528/272, 296, 297, 300, 528/306, 308, 499; 525/42, 43, 44, 451, 921

[56] References Cited

U.S. PATENT DOCUMENTS

| | | | |
|---|---|---|---|
| 4,458,038 | 7/1984 | Ramlow et al. | 521/137 |
| 4,568,705 | 2/1986 | Grace et al. | 521/137 |
| 4,585,828 | 4/1986 | Meixner et al. | 524/604 |
| 4,673,758 | 6/1987 | Meixner et al. | 560/90 |
| 4,722,966 | 2/1988 | Flakus | 524/840 |

Primary Examiner—John Kight, III
Assistant Examiner—Samuel A. Acquah
Attorney, Agent, or Firm—Sprung, Horn, Kramer & Woods

[57] ABSTRACT

Water soluble, polymerizable binders suitable for surface coating contain co-condensed residues of at least two polyalkylene glycols with different molecular weights, an alkoxylated polyol, a polycarboxylic acid and an optionally substituted acrylic acid.

10 Claims, No Drawings

POLYMERIZABLE WATER SOLUBLE BINDERS

This invention relates to water soluble, polymerisable binders for lacquer applications.

Lacquer systems containing little or no organic solvent are gaining in importance (see e.g. O. Luckert, Emissionsarm Lackieren; publishers C. R. Vincentz-Verlag, Hannover, 1987). For many applications, however, it is still necessary to use diluents for obtaining the required viscosity for processing.

The lacquer binder may be combined with so called reactive diluents (e.g. hexane diol diacrylate) which serve as solvents before the lacquer is cured but are chemically incorporated in the lacquer film after curing, (see e.g. R. Holman, UV & EB Curing Formulation for Printing Inks, Coatings and Paints, publishers Sita-Technol, London, 1984, page 47).

Such lacquer systems of binders and reactive diluents emit little or no organic substances but may have a powerful irritant or sensitizing effect on the skin. The proportion of reactive diluent, which varies with the viscosity, in some cases has a considerable influence on the properties of the lacquer. Lastly, such lacquer systems with a solids content of 100% are unsuitable for lacquering open pored wood. When the solvents used can be diluted with water, the processing viscosity of the lacquers is adjusted by the addition of water. Lacquer binders are, however, generally insoluble in water and can only be emulsified.

The following disadvantages therefore result:
1. The dispersion is difficult to prepare.
2. The storage stability is limited.
3. The viscosity is more difficult to adjust in dispersions than in true solutions in which it can be lowered to the required value by increasing the proportion of diluents.
4. When dispersions are used for lacquering wood, the lacquers generally do not wet the pores of the wood as readily as lacquers which are true solutions.

Water dilutable binders used for radiation curing have hitherto always been oil in water dispersions (see e.g. DE-A-3 441 154, EP-A-0 209 684, DE-A-3 340 589).

It is known from DE-A-3 340 589 that lacquer raw materials suitable for radiation curing can be prepared by the co-condensation of dicarboxylic acid anhydrides and acrylic acid with saturated divalent polyether alcohols, divalent saturated alcohols and trivalent saturated alkoxylated alcohols. Lacquer binders of this type are emulsifiable but not soluble in water. According to DE-A-3 340 589, emulsifiable or even water soluble products are obtained by the incorporation of relatively high proportions of polyalkylene glycols in the polyesters but these products have insufficient resistance to water.

DE-A-3 441 154 relates to unsaturated polyesters which may be dispersed in water without organic solvents and without external emulsifiers. One disadvantage of these polyesters is their slow curing compared with acrylate esters. They also have the general disadvantage of emulsions/dispersions (see above).

It is an object of the present invention to provide a water soluble, polymerisable lacquer binder which has good lacquer properties after curing, especially resistance to water.

This invention relates to water soluble, polymerisable binders which are suitable for surface coating, containing co-condensed residues of compounds containing hydroxyl groups, at least one polycarboxylic acid and at least one unsaturated carboxylic acid, characterised in that the binder is obtainable by the condensarion of at least one of the following compounds:

1. A polyalkylene glycol A having a molecular weight of from 200 to 800, in particular a polyethylene glycol;
2. A polyalkylene glycol B having a molecular weight of from 1000 to 5000, optionally modified;
3. An alkoxylated polyol C;
4. A polycarboxylic acid D in particular a dicarboxylic acid E or a tricarboxylic acid F; and
5. An optionally substituted acrylic acid G, the binder containing at least 10 parts by weight of A and 5 parts by weight of B to 100 parts by weight of the sum of components A to G.

The molecular weights are number average molecular weights $\overline{M}_n$ unless otherwise indicated.

In a preferred embodiment, from 0.8 to 1 mol of carboxylic acid groups, optionally in the form of anhydride groups, based on components A to C, are used for the preparation. Preferred polyalkylene glycols A are polyethylene glycols, in particular with a molecular weight of from 300 to 600. Preferred polyalkylene glycols B have a molecular weight of from 1500 to 3000. They include in particular polyethylene glycol, ethylene glycol/propylene glycol copolymers and hydroxyl-containing polyesters obtained from preferably 90 to 95% by weight of polyalkylene glycol, in particular polyethylene glycol, and 5 to 10% by weight of dicarboxylic acid or dicarboxylic acid anhydride, in particular the reaction product of polyethylene glycols having a molecular weight of about 400 and maleic acid anhydride.

In a particularly preferred embodiment, the polyalkylene glycols A and B have a molecular non-uniformity of $\overline{M}_w/\overline{M}_n \leq 2$ (see H. G. Elias, Makromoleküle, publishers Hüthig and Wepf, Basle, Heidelberg, New York, 4th Edition, 1981, page 256).

Preferred alkoxylated polyols C have more than two hydroxyl end groups and from 3 to 20 mol of ethylene or propylene oxide units per mol of polyol. The polyols C preferably have a molecular weight of about 250 to 600 g/mol. Glycerol or trimethylol propane grafted with 3 to 6 mol of ethylene oxide or propylene oxide per mol of triol are particularly preferred compounds C.

The polycarboxylic acids D are preferably dicarboxylic acids E or tricarboxylic acids F or the anhydrides thereof. Preferred compounds D are maleic acid (anhydride), fumaric acid, malonic acid, itaconic acid, succinic acid, adipic acid, phthalic acid (anhydride), hydrogenated or partially hydrogenated phthalic acid or equivalent quantities of tricarboxylic acid, trimellitic acid (anhydride) or citric acid/citric acid derivatives or mixtures thereof. Maleic acid anhydride is particularly preferred.

Preferred unsaturated carboxylic acids G are acrylic acid and methacrylic acid.

In a preferred embodiment, components A to G are used in the following proportions:

| | |
|---|---|
| Polyalkylene glycol A: | 0.02 to 0.1 mol, in particular 0.05 to 0.07 mol, |
| Polyalkylene glycol B: | 0.002 to 0.02 mol, in particular 0.004 to 0.006 mol, |
| Alkoxylated polyol C: | 0.05 to 0.25, in particular 0.1 to 0.15 mol, |
| Polycarboxylic acid D: | 0.05 to 0.25 mol, in particular 0.15 to 0.2 mol in the case of a di- |

| | |
|---|---|
| | carboxylic acid E and 0.06 to 0.18 mol in the case of a tricarboxylic acid F, and |
| Unsaturated carboxylic acids G: | 0.05 to 0.35 mol, in particular 0.12 to 0.18 mol. |

The usual auxiliary agents such as inhibitors, condensation accelerators, radical formers or photo initiators for curing may be used in the preparation of the binders according to the invention.

The binders according to the invention are preferably prepared by solvent free condensation at 150° to 250° C. followed by condensation of the unsaturated carboxylic acid G with azeotropic removal of water. In the method of preparation according to the invention, the alkoxylated polyol C is preferably added at the first stage of solvent free condensation.

The preparation of the product according to the invention may selectively also be carried out in one stage with azeotropic removal of water.

The azeotropic entrainers may be organic hydrocarbons such as cyclohexane, isooctane, benzene or toluene. Organic and inorganic acids are suitable as esterification catalysts, e.g. para-toluene sulphonic acid, hydrochloric acid or concentrated sulphuric acid. Hydroquinone derivatives are suitable as inhibitors against premature polymerisation, e.g. di-tert.-butyl hydroquinone used in combination with the passage of a stream of air through the reaction mixture, or phenothiazine combined with a nitrogen atmosphere. Suitable inhibitors are described, for example, in "Houben Weyl, Methoden der Organischen Chemie", 4th Edition, volume 14/1, page 433 et seq. G. Thieme Verlag, Stuttgart (1961), as Prinzip der Schmelzkondensation in volume 14/2 (1963), page 32 et seq.

The water soluble lacquer binders according to the invention are surprisingly found to have good lacquer properties. The use of two polyethylene glycols with different molecular weights is necessary for the purpose of the invention, as will be seen from comparison example 1. In comparison example 1, polyethylene glycol 600 is used alone, and the reaction products obtained are not water soluble.

The lacquer properties may be varied as desired according to the particular requirements by the addition of reactive diluents, e.g. hexane diol diacrylate, other high molecular weight lacquer binders, levelling agents, matting agents, etc.

Spraying, roller application and casting are suitable methods of application.

The binder according to the invention forms true or colloidal solutions in water. Colloidal solutions are solutions in which the particle size is so small that a sample in a test tube having an internal width of 10 mm still appears transparent in daylight when viewed with the naked eye.

The binder according to the invention may be polymerised after evaporation of the water. Lacquer coats with advantageous surface properties are then obtained, e.g. on wood. The polymerisation may be carried out by heat with the addition of polymerisation initiators (e.g. radical formers) or by means of high energy radiation (UV, electron beams, X-rays, gamma rays). When curing is carried out with UV light, it generally is necessary to add photo initiators (e.g. benzophenone, benzoin ethers, see S. P. Pappas, UV Curing, Science and Technology, Technology Marketing Corp., Norwalk, USA (1978), page 9).

The lacquer binder may be diluted not only with water but if desired also with organic solvent, e.g. with ethanol. A marked reduction in the viscosity of the mixture is obtained with only slight dilution.

The binder according to the invention may be used in particular in lacquers based on water and unsaturated polyesters or acrylates and containing the usual lacquer components, such as in particular photo initiators and/or peroxides or azo compounds and other lacquer binders, e.g. acrylates, polyurethanes or cellulose derivatives, e.g. cellulose nitrate, and levelling agents, deaerators, inhibitors and agents which impart thixotropic properties, and optionally also organic solvents, e.g. ethanol.

EXAMPLE 1

The following substances are introduced into a 500 ml two-necked flask and heated in the open flask to 180° C. for 30 minutes under normal pressure: 22 g (0.055 mol) of polyethylene glycol 400, 10 g (0.005 mol) of polyethylene glycol 2000, 38 g (0.13 mol) of tripropoxylated trimethylolpropane, 17 g (0.17 mol) of maleic acid anhydride, 0.8 g of para-toluene sulphonic acid and 0.1 g of di-tert.-butyl hydroquinone. After cooling of the reaction mixture, 200 ml of toluene and 10.7 g of acrylic acid (0.15 mol) are added in a second stage and the mixture is heated on a water separator with reflux condenser (145° C. bath temperature) for 15 hours.

The second reaction stage is carried out in a circulation apparatus with water separator followed by solvent drying with molecular sieve, see D. Braun, H. Cherdron, W. Kern, Praktikum der Makromolekularen Organischen Chemie, publishers A. Hüthig, Heidelberg, 3rd Edition (1979), page 71.

A reaction product having an acid number of about 20 mg KOH/g is obtained after removal of the toluene on a rotary evaporator (at 50 mbar). The reaction product is highly viscous and solidifies to a waxy consistency after a few days.

USE

After the addition of 3% 2-hydroxy-2-methyl-1-phenyl-propan-1-one: benzophenone in the ratio of 2:1 to the 50% aqueous solution of the reaction product from Example 1, the sample is applied to a glass plate (thickness of layer 90 μm) with a coating knife, dried and exposed to UV light (80 W/cm). A transparent, smooth film having a pendulum hardness according to König (DIN 53 157) of 50 s is obtained. The lacquer coat is water resistant according to DIN 53 168 (see Table 1).

EXAMPLE 2

Example 1 is repeated with the difference that 38 g (0.13 mol) of ethoxylated glycerol are used instead of tripropoxylated trimethylolpropane. A highly viscous product which is readily soluble in water is obtained. The product can be adjusted to a suitable working viscosity by the addition of small quantities of water.

The pendulum hardness of the lacquer film prepared as described above is 65 s and the film is water resistant (see Table 1).

EXAMPLES 3 AND 4

Example 1 is repeated with different proportions of the starting material (see Table 1). The products are water soluble and the lacquer films are water resistant after curing.

EXAMPLE 5

Example 5 is carried out analogously to Example 2 but with methacrylic acid (see Table 1).

COMPARISON EXAMPLE 3

This Comparison Example is carried out in accordance with Example 5 of DOS 3 340 589. The product obtained is emulsifiable but not soluble in water (see Table 1).

TABLE 1

| Component (Mol) | Product | | | | | | | |
|---|---|---|---|---|---|---|---|---|
| | Example 1 | Example 2 | Example 3 | Example 4 | Example 5 | Comparison Example 1 | Comparison Example 2 | Comparison Example 3 |
| Polyethylene glycol 400 | 0.055 | 0.055 | 0.036 | 0.056 | 0.055 | — | 0.055 | — |
| Polyethylene glycol 2000 | 0.0050 | 0.0050 | 0.0040 | 0.035 | 0.0050 | — | 0.0050 | 0.023 |
| Polyethylene glycol 600 | — | — | — | — | — | 0.625 | — | — |
| 1,2-propylene glycol | — | — | — | — | — | — | — | 0.48 |
| Tripropoxylated trimethylolpropane | 0.13 | — | 0.14 | 0.13 | — | 0.13 | — | 1.0 |
| Tetraethoxylated glycerol | — | 0.13 | — | — | 0.13 | — | — | — |
| Glycerol | — | — | — | — | — | — | 0.13 | — |
| Maleic acid anhydride | 0.17 | 0.17 | 0.17 | 0.17 | 0.17 | 0.12 | 0.17 | 1.0 |
| Acrylic acid | 0.15 | 0.15 | 0.15 | 0.15 | — | 0.25 | 0.15 | 1.8 |
| Methacrylic acid | — | — | — | — | 0.15 | — | — | — |
| Water soluble | Yes | Yes | Yes | Yes | Yes | No | Not applicable (product gels) | No |
| Acid number (mg KOH/g) | 25 | 20 | 20 | 11 | 20 | 11 | — | 11 |
| Pendulum hardness (es) according to DIN 53 157 50μ on glass | 50 | 65 | 50 | 50 | 55 | 45 | — | 50 |
| Levelling on wood | good | good | good | good | good | good | — | slight pitting |
| Water resistance (DIN 53 169) | positive | positive | positive | positive | positive | failed | — | positive |
| Grid section quality (ISO standard 2409) | GT 0 | GT 0-1 | GT 1 | GT 1 | GT 1 | GT 1 | — | GT 2 |

EXAMPLE 6

Example 2 is repeated but with the difference that all starting materials are reacted with toluene with azeotropic removal of water, i.e. there is no solvent free condensation stage. A product having the same properties as the product of Example 2 is obtained after a reaction time of 14 hours.

COMPARISON EXAMPLE 1

This example differs from Examples 1 to 4 according to the invention in that polyethylene glycol 600 alone is used (see Table 1). The product is not water soluble, and when diluted with water it forms an emulsion which separates into two phases within one day. After UV curing, the lacquer films produced as in Example 1 absorb water in proportion to the atmospheric moisture and thereby suffer a definite loss in quality.

COMPARISON EXAMPLE 2

In Comparison Example 2, glycerol is used as triol component. The product gels prematurely when the second reaction stage is carried out, even with an elevated inhibitor concentration (2500 ppm). Glycerol which has not been alkoxylated is therefore unsuitable as alcohol component (see Table 1).

We claim:

1. Water soluble, polymerisable binders suitable for surface coating, containing co-condensed residues of hydroxyl group-containing compounds, at least one polycarboxylic acid and at least one unsaturated carboxylic acid, wherein the binder is obtained by the condensation of at least one each of the following compounds:
   1. a polyalkylene glycol A having a molecular weight of from 200 to 800;
   2. a polyalkylene glycol B having a molecular weight of from 1000 to 5000;
   3. an alkoxylated polyol C;
   4. a polycarboxylic acid D; and
   5. an optionally substituted acrylic acid G, the binder containing at least 10 parts by weight of A and 5 parts by weight of B, based on 100 parts by weight of the sum of components A to G.

2. Binders according to claim 1, wherein the starting compounds A to G have been reacted with 0.8 to 1 mol of carboxyl groups per mol of OH groups.

3. Binder according to claim 1, wherein said binder is obtained by the co-condensation of 0.02 to 0.1 mol of polyalkylene glycol A, 0.002 to 0.02 mol of polyalkylene glycol B, 0.05 to 0.25 mol of alkoxylated polyol C, 0.05 to 0.25 mol of polycarboxylic acid D and 0.05 to 0.35 mol of optionally substituted acrylic acid G.

4. Binder according to claim 1, wherein the alkoxylated polyol C contains more than 2 hydroxyl end groups and 2 to 20 mol of ethylene or propylene oxide units per mol of polyol.

5. Binder according to claim 1, wherein the polycarboxylic acid D is a dicarboxylic acid E or a tricarboxylic acid F and the unsaturated carboxylic acid G is acrylic acid or methacrylic acid.

6. Binder according to claim 1, wherein the polycarboxylic acid D is maleic acid, maleic acid anhydride, fumaric acid, malonic acid, itaconic acid, succinic acid, adipic acid, phthalic acid, phthalic acid anhydride, optionally hydrogenated phthalic acid, trimellitic acid or citric acid.

7. Binder according to claim 1, wherein the polyalkylene glycol A is polyethylene glycol.

8. Binder according to claim 1, wherein the polyalkylene glycol B is polyethylene glycol, a copolymer of ethylene glycol and propylene glycol or a hydroxyl group-containing polyester of 90 to 95% by weight of polyalkylene glycol and 5 to 10% by weight of dicarboxylic acid or dicarboxylic acid anhydride.

9. In a lacquer containing binders and conventional other additives, the improvement wherein the binder is a water-soluble, polymerizable binder according to claim 1.

10. In a process for lacquering a surface with a lacquer, the improvement comprising applying to said surface the lacquer according to claim 9.

* * * * *